Feb. 2, 1971 B. BARENYI 3,560,020
TEMPLE PROTECTION, ESPECIALLY FOR PASSENGER MOTOR VEHICLES
Filed Oct. 17, 1968 2 Sheets-Sheet 1

INVENTOR
BELA BARENYI
BY Craig & Antonelli
ATTORNEYS

Feb. 2, 1971   B. BARENYI   3,560,020
TEMPLE PROTECTION, ESPECIALLY FOR PASSENGER MOTOR VEHICLES
Filed Oct. 17, 1968   2 Sheets-Sheet 2

INVENTOR
BELA BARENYI
BY *Craig & Antonelli*
ATTORNEYS

United States Patent Office 3,560,020
Patented Feb. 2, 1971

3,560,020
TEMPLE PROTECTION, ESPECIALLY FOR
PASSENGER MOTOR VEHICLES
Bela Barenyi, Stuttgart-Vaihingen, Germany, assignor to
Daimler-Benz Aktiengesellschaft, Stuttgart-Unterturkheim, Germany
Filed Oct. 17, 1968, Ser. No. 768,394
Claims priority, application Germany, Oct. 20, 1967,
P 16 30 372.3
Int. Cl. B60r 21/04
U.S. Cl. 280—150
30 Claims

ABSTRACT OF THE DISCLOSURE

A temple protection for increasing the interior safety of a passenger space formed by a closed vehicle body, especially of passenger motor vehicles, in which a preferably padded rail is mounted within the area of the upper edge of the side windows and/or door apertures that extends essentially from the windshield to the rear window; the rail is secured at the vehicle body or at the lateral roof bearer with a spacing to the lateral wall by means of deformation members.

---

The present invention relates to a temple protection for increasing the internal safety of a passenger space consisting of a closed motor vehicle body, especially of passenger motor vehicles.

In the known passenger motor vehicles there are disposed constructively necessitated, sharp-edged projections or beads above the side windows and/or door apertures which during accidents, especially during accidents in which the motor vehicle rolls over, may lead to serious injuries of the vehicle passengers.

The present invention aims at avoiding these disadvantages and at increasing the interior safety of such types of passenger spaces with lowest possible structural expenditures. The present invention essentially consists in that within the area of the upper edges of the side windows and/or of the door apertures a preferably padded rail extending essentially from the windshield to the rear window is provided, which is secured at the vehicle body or at a lateral roof bearer with a spacing to the lateral wall by means of deformation members. An installation is created thereby which in case of impact of a vehicle passenger as a result of an accident yields or is plastically deformable under dissipation of energy and helps in this manner to avoid dangerous injuries of the vehicle passengers.

Advantageously, the lower edge of the rail extending rectilinearly from in front toward the rear may be disposed slightly lower than the upper edge of the side windows and/or door cut-outs. In order to avoid also injuries by the sharp-edged window and/or door columns, the rail may be extended downwardly within the area of the window and/or door columns and may preferably extend above the windshield up to the vehicle center. By this construction all sharp-edged parts in the upper half of the passenger space are covered off by the rail so that a greatest possible safety for the passengers of the vehicle is realized thereby.

In order not to have to abandon the handles frequently arranged in passenger motor vehicles above the door apertures, the rail may be provided with a pressed out portion or an embossment covered by a handle bar. However, provision may also be made that the rail is provided with an aperture for the formation of a handle.

Advantageously, the rail may have a lesser deformation rigidity than the deformation members and thus, be plastically deformable. Furthermore, the rail can be constructed as support for additional installations, for example, lighting installations for the passenger space.

According to a further feature of the present invention, the rail may extend directly up to below the vehicle roof. In addition to the advantge that a large impact surface is created thereby, one obtains the additional advantage that the inner lateral edges of the roof are covered off so that the ceiling may consist, for example, of a foil which can be glued in a structurally extraordinarily simple manner directly to the roof sheet metal panels. Since the edges of this foil are not visible, no particular care and accuracy has to be used for the formation thereof.

Advantageously, the deformation members may be constructed as conventional deformation pots. Frequently, it may suffice if in a structurally simple manner the deformation members consist of trapezoidally shaped bent sheet metal strips. Furthermore, pressed out portions, embossments or indentations of the roof bearer and/or of the rail may serve as deformation members.

An extremely advantageous type of construction of the present invention is obtained if two Z-shaped, bent sheet metal members are used as deformation members which together form a hollow body and are secured eccentrically at the rail.

Accordingly, it is an object of the present invention to provide a passenger motor vehicle which eliminates by simple means the inadequacies as regards temple protection of the passenger encountered in the prior art constructions.

Another object of the present invention resides in a passenger motor vehicle with a passenger space so constructed as to minimize serious injuries of the vehicle passengers, particularly in case of accidents causing the vehicle to roll over.

Still another object of the present invention resides in a passenger motor vehicle, in which the safety of the passengers is greatly increased with structurally simple and relatively inexpensive means.

A still further object of the present invention resides in a passenger motor vehicle which offers effective temple-protection to the passengers of the vehicle by safety devices that are simple in structure, easy to install and effective in operation.

Still another object of the present invention resides in a passenger motor vehicle with a passenger space that not only achieves all of the aforementioned aims and objects but additionally reduces the need for particular care and accuracy in the installation of the roof sky or ceiling material.

These and further objects, features and advantages of the present invention will become more obvious from the following description when taken in connection with the accompanying drawing, which shows for purposes of illustration only, several embodiments in accordance with the present invention and wherein.

Figure 1:
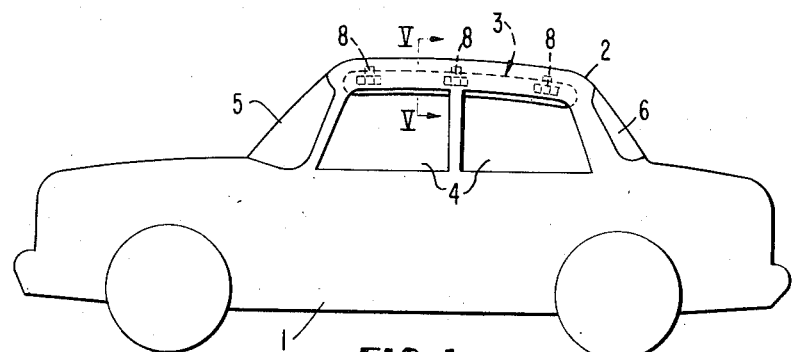
FIG. 1 is a schematic side view of a passenger motor vehicle with a temple protection in accordance with the present invention.
Figure 2:
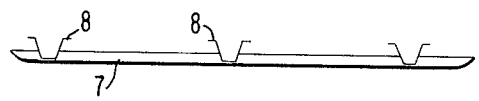
FIG. 2 is a partial elevational view of the temple protection of the passenger motor vehicle according to FIG. 1, on a slightly enlarged scale.

Referring now to the drawing wherein like reference numerals are used throughout the various views to designate like parts, and more particularly to FIG. 1, the motor vehicle 1 illustrated in this figure is equipped for the purpose of reducing the injury danger of the vehicle passengers, with a temple protection generally designated by reference numeral 3 in its passenger space consisting of a closed body 2. This temple protection 3 covers with a spacing the sharp edges and bulges disposed above the side windows 4 and/or door apertures. As shown in FIG. 2, this temple protection 3 consists of a rectilinear rail 7, preferably made from sheet metal, extending substantially rectilinearly from the windshield 5 to the rear window 6, which is secured by way of deformation, or deformable members 8 at the body or at a roof bearer at a distance from the lateral wall. In a structurally simple manner, the deformation members 8 may consist of trapezoidally shaped, bent sheet metal strips.

Figure 3:
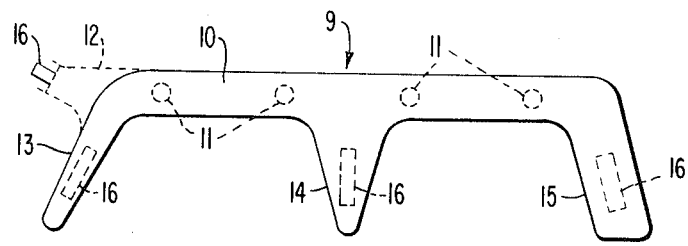
FIG. 3 is a side elevational view of a further embodiment of a temple protection in accordance with the present invention.
Figure 4:
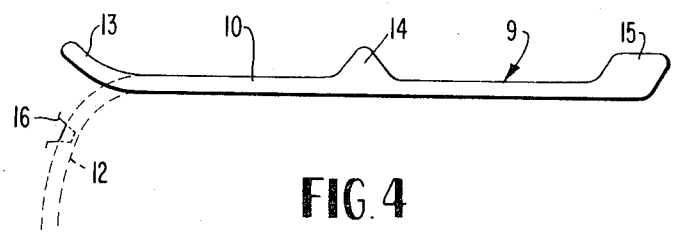
FIG. 4 is a plan view on the temple protection according to FIG. 3.

A temple protection generally designated by reference numeral 9 is schematically illustrated in FIGS. 3 and 4 which covers essentially all of the edges disposed in the upper half of the passenger space of the vehicle. For that purpose the rail 10 is extended downwardly within the area of the window columns and of the door columns. Additionally, the rail 10 may also extend up to the center of the vehicle in front of the upper edge of the windshield 5 as indicated in dash line. Conventional deformation pots 11 are provided as deformation members at the horizonal section of the rail 10 and trapezoidally shaped sheet metal strip 16 are provided as deformation members at the section 12 disposed above the windshield as well as the vertical, downwardly directed portions 13, 14 and 15 of the rail 10. Since the impact of the vehicle passengers, particularly in case of rolling-over of the vehicle, takes place obliquely upwardly, the rectilinear rails 7 and 10 of the two embodiments are so arranged that the lower edges thereof are disposed slightly below the upper edge of the side windows 4 and/or of the door apertures.

Figure 5:
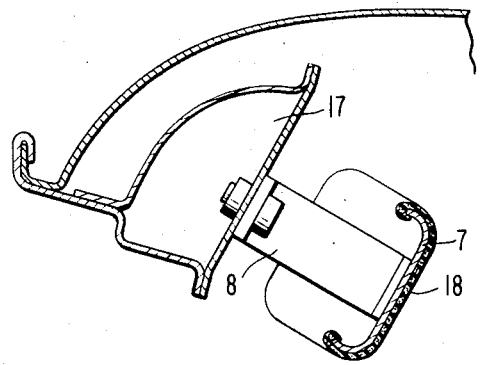
FIG. 5 is a partial cross-sectional view taken along line V—V of the motor vehicle of FIG. 1.

As illustrated in FIG. 5, the rail 7 may consist of a simple approximately U-shaped sheet metal profile which is secured at the roof bearer 17 by way of trapezoidally shaped curved or bent sheet metal strips that act as deformation members 8. Appropriately, the rail 7 is also provided with a padding layer 18 of any conventional material.

Figure 6:
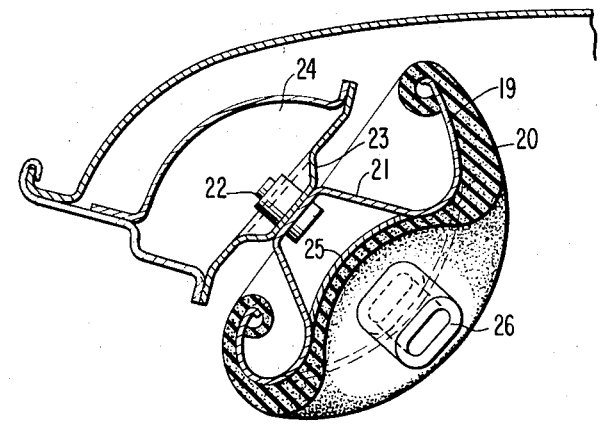
FIG. 6 is a partial cross-sectional view, similar to FIG. 5, of a modified embodiment of a temple protection in accordance with the present invention.

The temple protection of the embodiment according to FIG. 6 consists of a rail 19 curved in the direction of the passenger space which is covered with a heavy padding layer 20. Pressed-out portions or embossments 21 provided in the rail 19 thereby serve as deformation members which are secured by means of bolts 22 at the roof bearer 24, also provided with embossments pressed-out portions 23. In order to provide a handle in this construction, the rail 19 is provided with a pressed-out portion or embossment 25 which is covered by a padded handle bar 26.

Figure 7:
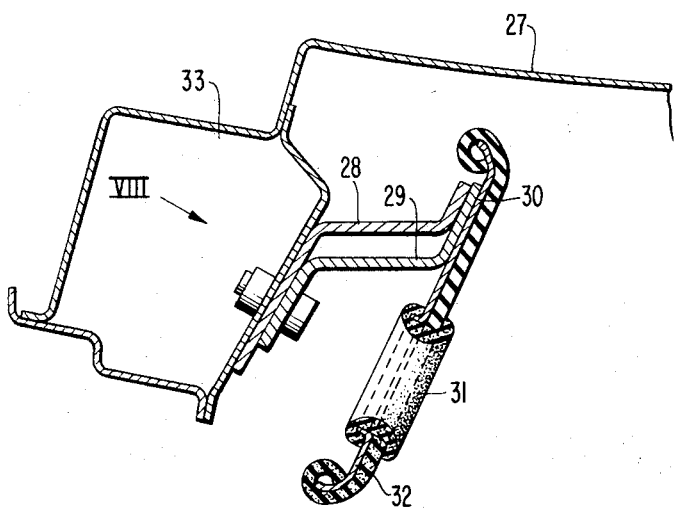
FIG. 7 is a partial cross-sectional view, similar to FIGS. 5 and 6, through a still further modified embodiment of a motor vehicle equipped with a concave roof and a temple protection in accordance with the present invention.
Figure 8:
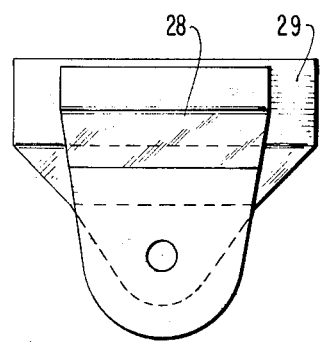
FIG. 8 is a partial elevational view on the deformation member illustrated in FIG. 7 in the direction of arrow VIII of FIG. 7.

A temple protection for a vehicle equipped with a concave roof 27 is illustrated in FIG. 7. Two Z-shaped, bent sheet metal strips 28 and 29 thereby serve as deformation members which together form a hollow profile or sectional member at the webs thereof and are secured eccentrically at an approximately U-shaped rail 30 consisting of sheet metal. The rail 30 which is also padded in a conventional manner, possess an aperture 31 whereby portion 32 of the rail 30 disposed below the aperture 31 may serve as a handle. For this type of construction in which the rail 30 extends almost directly up to the roof sheet metal panels, there results additionally the advantage that the installation of a ceiling or sky may be realized in an extremely simple manner. The ceiling or sky may thereby consist of a foil whose lateral edges extend parallel to the roof bearer 33 and which is directly glued or bonded to the roof sheet metal panel 27. Since the lateral edges of the foil are not visible, a time-consuming and costly installation and fitting can be dispensed with. A ceiling or sky for the passenger space may also be installed in a similar manner in the embodiment according to FIG. 6.

The temple-protection of the illustrated embodiments which considerably increases the safety of the vehicle passengers, can be constructed for the accommodation of additional installations, for example for the accommodation of lighting installations to provide an indirect illumination of the passenger space.

While I have shown and described several embodiments in accordance with the present invention, it is understood that the same is not limited thereto but is susceptible of numerous changes and modifications as known to a person skilled in the art and therefore I do not wish to be limited to the details shown and described herein but intend to cover all such changes and modifications as are within the scope of those skilled in the art.

I claim:

1. A temple protection for increasing the internal safety of a passenger space formed by a closed vehicle body, especially of passenger motor vehicles, comprising plastically deformable rail means for absorbing energy when a part of the body of a passenger impinges thereon provided within at least a portion of the area defined by the upper edge of the two parts consisting of side windows and door apertures, said rail means extending essentially from the windshield to the rear window, and plastically deformable means for securing said rail means a spaced distance from a lateral portion of said vehicle body adjacent said area, to further absorb impact energy by plastically deforming when a part of said passenger body impinges on said rail means.

2. A temple protection according to claim 1, wherein said rail means is padded.

3. A temple protection according to claim 1, wherein said lateral portion is a lateral roof bearer means.

4. A temple protection according to claim 1, wherein said rail means are extended downwardly within at least a portion of the area defined by the two parts consisting of door column means and of windows.

5. A temple protection according to claim 1, wherein the rail means extends above the windshield approximately up to the vehicle center.

6. A temple protection according to claim 1, wherein the rail means are provided with embossing means covered by handle bar.

7. A temple protection according to claim 1, wherein the rail means are provided with aperture means for the formation of a handle.

8. A temple protection according to claim 1, wherein the rail means have a smaller deformation strength than the securing means.

9. A temple protection according to claim 1, wherein said rail means extends up to directly below the vehicle roof.

10. A temple protection according to claim 1, wherein said securing means are constructed as deformation pots.

11. A temple protection according to claim 1, wherein said securing means include trapezoidally shaped, bent sheet metal strips.

12. A temple protection according to claim 1, wherein said securing means includes two Z-shaped sheet metal members which together form a hollow body that is eccentrically secured at the rail means.

13. A temple protection according to claim 1, wherein the rail means are constructed as support for additional installations.

14. A temple protection according to claim 13, wherein said additional installations include lighting installations for the passenger space.

15. A temple protection according to claim 1, wherein said rail means extends approximately rectilinearly within said space and wherein the lower edge of the approximately rectilinearly extending rail means is disposed slightly lower than at least a portion of the area defined by the upper edge of the two parts consisting of lateral windows and door apertures.

16. A temple protection according to claim 15, wherein said rail means are extended downwardly within at least a portion of the area defined by the two parts consisting of door columns and of windows.

17. A temple protection according to claim 16, wherein said rail means are extended downwardly within the area of the door columns and of the windows.

18. A temple protection according to claim 17, wherein the rail means extends above the windshield approximately up to the vehicle center.

19. A temple protection according to claim 18, wherein the rail means are provided with embossment means covered by a handle bar.

20. A temple protection according to claim 18, wherein the rail means are provided with aperture means for the formation of a handle.

21. A temple protection according to claim 18, wherein the rail means have a smaller deformation strength than said securing means.

22. A temple protection according to claim 21, wherein said rail means extends up to directly below the vehicle roof.

23. A temple protection according to claim 21, wherein said securing means are constructed as deformation pots.

24. A temple protection according to claim 21, wherein said securing means include trapezoidally shaped, bent sheet metal strips.

25. A temple protection according to claim 21, wherein embossment means of the roof bearer means and rail means serve as plastically deformable means for absorbing impact energy.

26. A temple protection according to claim 21, wherein embossment means of at least one of the two parts consisting of the roof bearer means and rail means serve as plastically deformable means for absorbing impact energy.

27. A temple protection according to claim 21, wherein the rail means are constructed as support for additional installations.

28. A temple protection according to claim 27, wherein said additional installations include lighting installations for the passenger space.

29. A temple protection according to claim 21, wherein said securing means includes two Z-shaped sheet metal members which together form a hollow body that is eccentrically secured at the rail means.

30. A temple protection according to claim 29, wherein said rail means is padded.

References Cited

UNITED STATES PATENTS

| | | | |
|---|---|---|---|
| 1,728,093 | 9/1929 | Wintz | 296—137(A) |
| 2,070,760 | 2/1937 | Straith | 280—150(B) |
| 2,116,915 | 5/1938 | Tellkamp | 296—137(A) |
| 2,624,596 | 1/1953 | Clingman | 280—150(B) |
| 2,806,730 | 9/1957 | Marshall | 280—150(X) |
| 2,916,324 | 12/1959 | Graham | 296—31(X) |
| 3,188,112 | 6/1965 | Oelkrug | 280—150 |

FOREIGN PATENTS

| | | | |
|---|---|---|---|
| 239,098 | 6/1962 | Australia | 280—150(B) |
| 1,115,317 | 12/1955 | France | 280—150(B) |
| 836,748 | 4/1952 | Germany | 280—150(B) |
| 457,327 | 3/1950 | Italy | 296—137(A) |
| 629,038 | 12/1961 | Italy | 280—150(B) |

LEO FRIAGLIA, Primary Examiner

L. J. PAPERNER, Assistant Examiner

U.S. Cl. X.R.

296—84